United States Patent
Chu

(10) Patent No.: US 7,301,954 B1
(45) Date of Patent: Nov. 27, 2007

(54) MULTIPLE-BUFFER QUEUEING OF DATA PACKETS WITH HIGH THROUGHPUT RATE

(75) Inventor: Tam-Anh Chu, Great Falls, VA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 1175 days.

(21) Appl. No.: 09/668,407

(22) Filed: Sep. 22, 2000

Related U.S. Application Data

(60) Provisional application No. 60/156,098, filed on Sep. 24, 1999.

(51) Int. Cl.
*H04L 12/56* (2006.01)

(52) U.S. Cl. .................. 370/412; 370/230; 710/35; 710/52

(58) Field of Classification Search ............... 370/412, 370/413, 428, 429; 710/35, 52, 56
See application file for complete search history.

(56) References Cited

U.S. PATENT DOCUMENTS

| | | | | |
|---|---|---|---|---|
| 5,546,391 A * | 8/1996 | Hochschild et al. | ........ | 370/413 |
| 5,875,189 A * | 2/1999 | Brownhill et al. | ....... | 370/395.7 |
| 5,936,956 A * | 8/1999 | Naven | ..................... | 370/395.7 |
| 6,011,775 A * | 1/2000 | Bonomi et al. | ............. | 370/230 |
| 6,088,745 A * | 7/2000 | Bertagna et al. | ............... | 710/56 |
| 6,128,306 A * | 10/2000 | Simpson et al. | ............. | 370/412 |
| 6,295,295 B1 * | 9/2001 | Wicklund | .................... | 370/392 |
| 6,310,884 B1 * | 10/2001 | Odenwald, Jr. | .............. | 370/412 |
| 6,320,865 B1 * | 11/2001 | Agrawala et al. | ........... | 370/413 |
| 6,349,089 B1 * | 2/2002 | Bonomi et al. | .......... | 370/230.1 |
| 6,366,984 B1 * | 4/2002 | Carmean et al. | ............ | 711/141 |
| 6,377,583 B1 * | 4/2002 | Lyles et al. | .................. | 370/412 |
| 6,396,834 B1 * | 5/2002 | Bonomi et al. | ............. | 370/394 |
| 6,401,147 B1 * | 6/2002 | Sang et al. | .................... | 710/56 |
| 6,496,478 B1 * | 12/2002 | Choi et al. | ................... | 370/229 |
| 6,523,060 B1 * | 2/2003 | Kao | ........................... | 709/202 |
| 6,539,024 B1 * | 3/2003 | Janoska et al. | ............. | 370/412 |
| 6,542,502 B1 * | 4/2003 | Herring et al. | ............. | 370/390 |
| 6,556,579 B1 * | 4/2003 | Lindeborg et al. | .......... | 370/412 |
| 6,570,876 B1 * | 5/2003 | Aimoto | ...................... | 370/389 |
| 6,594,270 B1 * | 7/2003 | Drummond-Murray et al. | ........................... | 370/412 |
| 6,628,652 B1 * | 9/2003 | Chrin et al. | ................. | 370/386 |
| 6,631,484 B1 * | 10/2003 | Born | .......................... | 710/305 |
| 6,721,796 B1 * | 4/2004 | Wong | ......................... | 709/232 |
| 2001/0009551 A1 * | 7/2001 | Moriwaki et al. | .......... | 370/395 |

* cited by examiner

*Primary Examiner*—Wing Chan
*Assistant Examiner*—Michael J. Moore
(74) *Attorney, Agent, or Firm*—Sterne, Kessler, Goldstein and Fox P.L.L.C.

(57) ABSTRACT

The present invention is a method and apparatus to buffer data. A buffer memory of a first type stores data associated with a connection identifier corresponding to a channel in a network. The data is organized into at least one chunk based on a linked list. The connection identifier identifies a connection in the channel. The data is part of a data stream associated with the connection. A packet memory of a second type provides access to the stored data when a transfer condition occurs.

48 Claims, 13 Drawing Sheets

MULTIPLE-BUFFER QUEUEING OF DATA PACKETS WITH HIGH THROUGHPUT RATE

CROSS-REFERENCES TO RELATED APPLICATIONS

This application claims the benefit of U.S. Provisional Patent Application No. 60/156,098 filed Sep. 24, 1999.

BACKGROUND

1. Field of the Invention

This invention relates to computer networks. In particular, the invention relates to data buffering in computer networks.

2. Description of Related Art

Demand in high speed data transmission has given rise to many broadband network protocols and standards. For example, the Synchronous Optical Network (SONET) has a number of clock speeds used in Wide Area Network (WAN) with bandwidth requirement ranging from megabits per second (Mbps) to several gigabits per second (Gbps). Popular standards include OC-3c (155 Mbps), OC-12c (622 Mbps), OC-48c (2.5 Gbps), OC-192c (10 Gbps), OC-768c (40 Gbps), etc.

In network applications, data are transmitted in variable-length packets at unpredictable time in real-time and therefore cannot be reliably cached. At a transmission rate of several Gbps, the buffering of network data (e.g., transient data) becomes a technical challenge because the bandwidth growth of semi conductor memories has not kept pace with network transmission bandwidth.

Therefore, there is a need to have an efficient technique to buffer data, (e.g., transient data) in network and other data transmission applications.

SUMMARY

The present invention is a method and apparatus to buffer data. A buffer memory of a first type stores data associated with a connection identifier corresponding to a channel in a network. The data is organized into at least one chunk based on a linked list. The connection identifier identifies a connection in the channel. The data is part of a data stream associated with the connection. A packet memory of a second type provides access to the stored data when a transfer condition occurs.

BRIEF DESCRIPTION OF THE DRAWINGS

The features and advantages of the present invention will become apparent from the following detailed description of the present invention in which.

DESCRIPTION

The present invention is a method and apparatus to buffer data (e.g., transient network data). A buffer memory of a first type stores data associated with a connection identifier corresponding to a channel in a network. The data is organized into at least one chunk based on a linked list. The connection identifier identifies a connection in the channel. The data from the network connection is stored in a virtual queue implemented as a linked list of fixed sized data chunks. The data is part of a data stream associated with the connection. A packet memory of a second type provides access to the stored data when a transfer condition occurs.

In one embodiment, the apparatus includes a descriptor memory and a controller. The descriptor memory stores descriptor information corresponding to the chunks. The controller controls data transfer between the buffer memory and the packet memory using the descriptor information. The chunk includes a chunk header and a chunk data block. The chunk header stores chunk information associated with the linked list and the chunk data block stores the data. The chunk header information includes a pointer to point to one other chunk, a size specifier to specify size of the chunk, and a type specifier to specify type of the chunk. The chunk may be a head chunk corresponding to the beginning of a data stream, a linking chunk corresponding to an intermediate portion of the data stream, or a tail chunk corresponding to the end of a data stream. The descriptor information includes one head pointer and one tail pointer pointing to the head and tail chunks, respectively.

The data transfer is performed by combining the data blocks of the chunks into a large data block. The large data block can then be burst written to or burst read from the packet memory using the burst mode of the synchronous dynamic random access memory (SDRAM). The linked list data structure allows a simple and transparent way to maintain a data stream across memories for stage buffering and actual storage, while maintaining correct data relationship.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
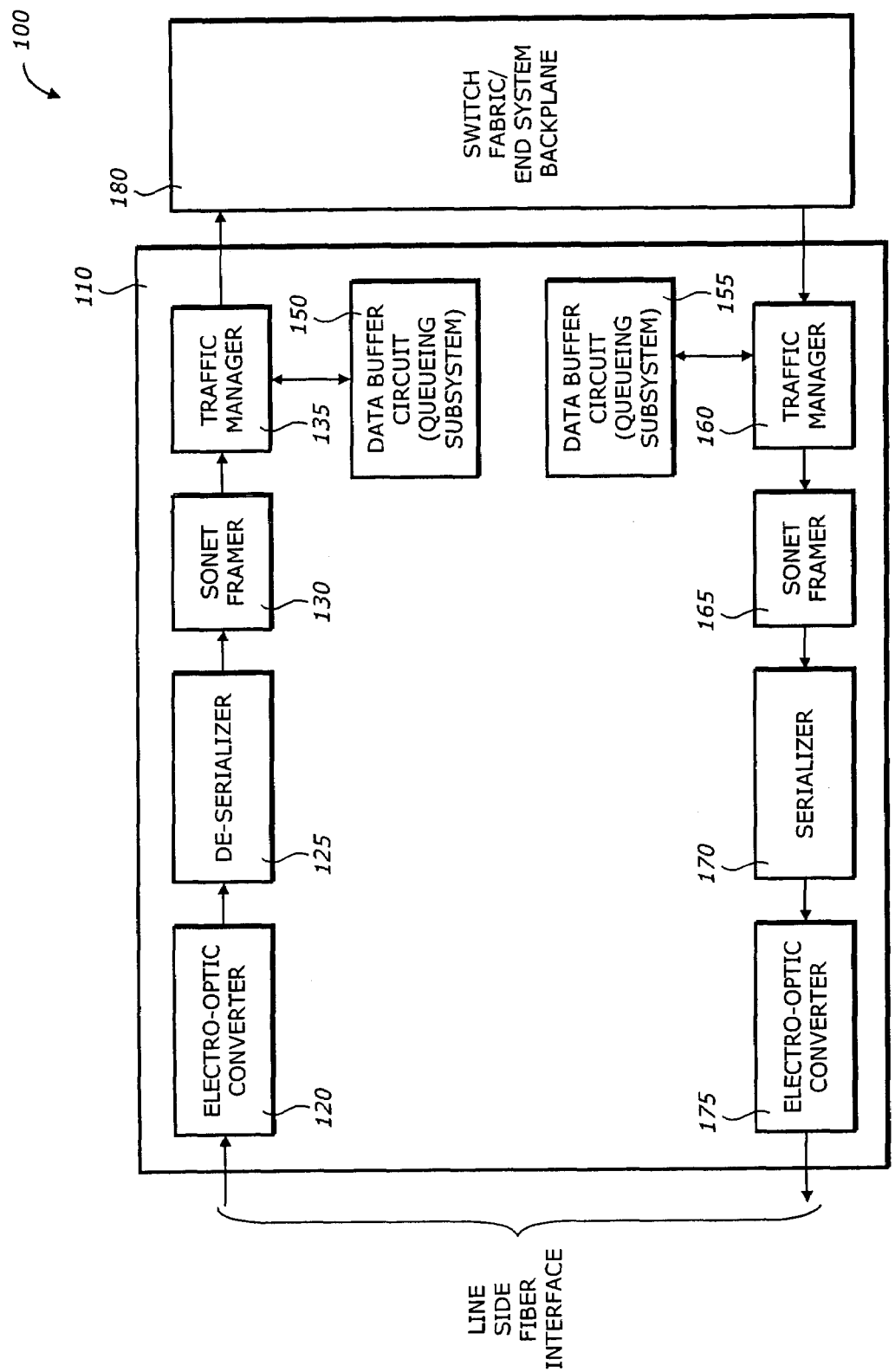
FIG. 1 is a diagram illustrating a system in which one embodiment of the invention can be practiced.

FIG. 1 is a diagram illustrating a system 100 in which one embodiment of the invention can be practiced. The system 100 includes a line card 110 and a switching fabric backplane 180.

The line card 110 plugs into the switching fabric backplane 180 to provide at least one pair of input/output line interfaces, usually laser interface, connected to an optical fiber. The line card 110 includes an electro-optical converter 120, a de-serializer 125, a SONET framer 130, an inbound traffic manager 135, data buffer circuits 150 and 155, an outbound traffic manager 160, a SONET framer 165, a serializer 170, and an electro-optical converter 175. The electro-optical converter 120, the de-serializer 125, the SONET framer 130, the inbound traffic manager 135, and the data buffer circuits 150 form the inbound flow to the switching fabric backplane 180. The data buffer circuit 155, the outbound traffic manager 160, the SONET framer 165, the serializer 170, and the electro-optic converter 175 form an outbound flow from the switching fabric backplane 180.

The electro-optical converter 120 converts a light pulse train from the line side fiber into electrical pulse train at high data rates, e.g., 2.5 GHz to 10 GHz, resulting in a serial data stream. The de-serializer 125 converts the serial data stream at high speed into a parallel data path at lower speed according to the parallel word size, e.g., 16 bits at 155 MHz. The SONET framer 130 extracts payload data from SONET framing. The payload format may be ATM, Internet Protocol (IP), or Frame Relay. The inbound traffic manager 135 manages, regulates and schedules the transmission of the payload data provided by the SONET framer 130 through the switching fabric backplane 180 to maximize bandwidth and minimize traffic congestion. The data buffer circuit 150 acts as a queuing subsystem to allow the segregation of payload data into a number of virtual queues, each being maintained individually in a common memory space.

The outbound flow has similar elements. The traffic manager 160 manages, regulates, and schedules the transmission of data from the switching fabric backplane 180 to maximize bandwidth and minimize traffic congestion. The data buffer circuit 155 acts as a queuing subsystem to allow the segregation of payload data into a number of virtual queues, each being maintained individually in a common memory space. The SONET framer 165 constructs a SONET frame from payload data provided by the traffic manager 160. The serializer 170 converts the parallel data from the SONET framer 165 into a serial data stream. The electro-optical converter 175 converts the electrical serial data stream into a light pulse train to the line side fiber interface.

Figure 2:
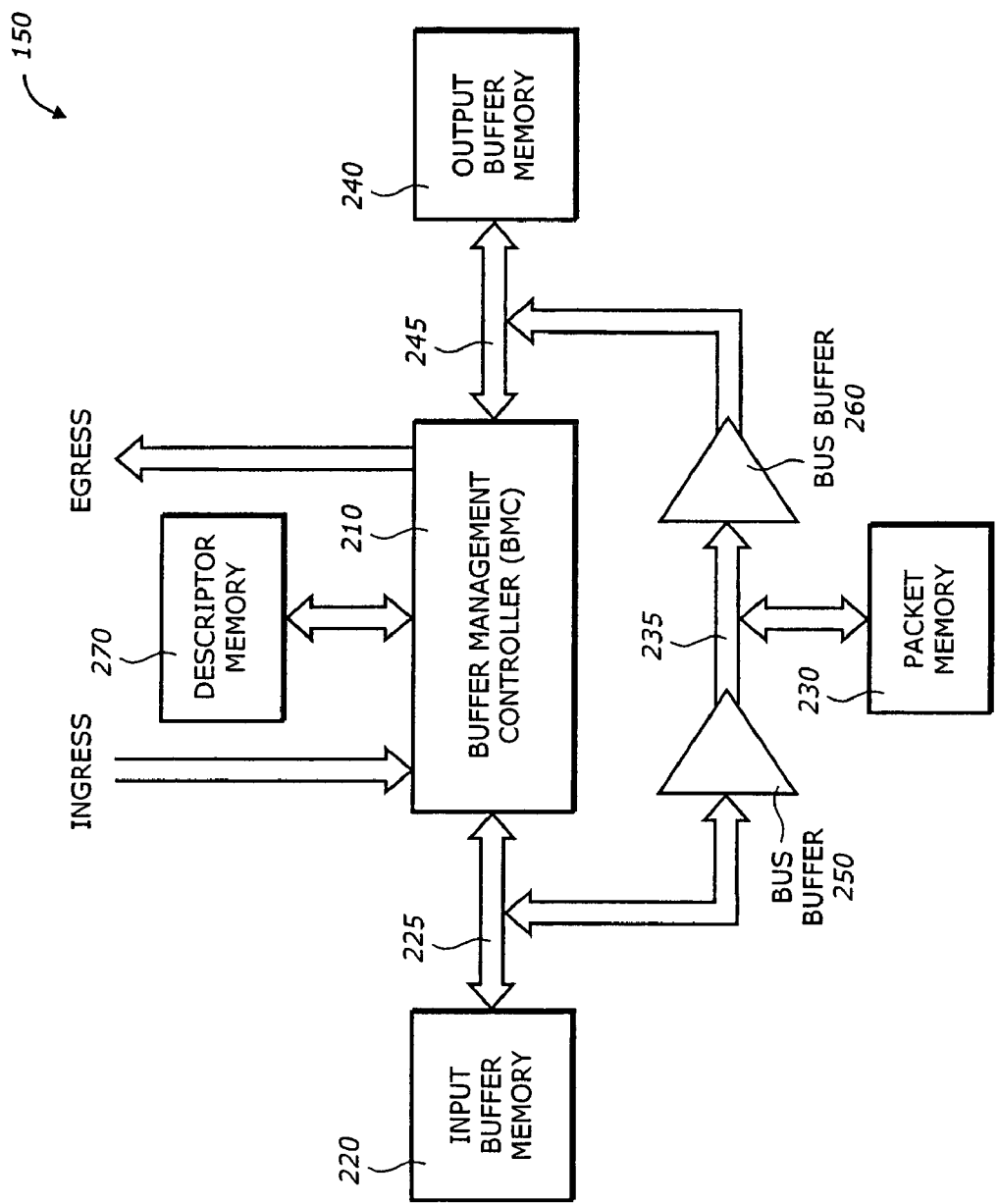
FIG. 2 is a diagram illustrating a data buffer circuit according to one embodiment of the invention.

FIG. 2 is a diagram illustrating a data buffer circuit 150 according to one embodiment of the invention. The data buffer circuit 150 includes a buffer management controller 210, an input buffer memory 220, a packet memory 230, an output buffer memory 240, bus buffers (tristate bus drivers) 250 and 260, buses 225, 235, and 245, and a descriptor memory 270.

The buffer management controller 210 receives data from the ingress side and sends the received data to the egress side. The buffer management controller 210 coordinates the data transfers between the input buffer memory 220, the packet memory 230, and the output buffer memory 240. The buffer management controller 210 also has temporary queues to buffer the data from the ingress and to the egress. The buffer management controller 210 is responsible for the organization of the data stream into chunks according to a linked list data structure to be described later in FIG. 3A. Each chunk contains a block of data of fixed size and other information.

The input buffer memory 220 stores the data belonging to a network connection, in the form of a linked list, chunks from the buffer management controller 210 sent over the bus 225. For storage and speed efficiency, the input buffer memory 220 is of a memory type which is different than that of the packet memory 230. In one embodiment, the input buffer memory 220 is implemented using static random access memory (SRAM) devices. The packet memory 230 receives data transferred from the input buffer memory 220 via the bus 235 and transmits data to the output buffer memory via the bus 245. The packet memory 230 is typically implemented using inexpensive memory devices which can support burst mode read and write such as synchronous dynamic random access memory (SDRAM). The output buffer memory 240 stores data transferred from the input buffer memory 220 and the packet memory 230. For storage and speed efficiency, the output buffer memory 230 is of a memory type which is different than that of the packet memory 230. In one embodiment, the output buffer memory 230 is implemented using static random access memory (SRAM) devices. The sizes of the input and output buffer memories 220 and 230 may be the same or different.

The descriptor memory 270 stores descriptor information regarding the chunks stored in the input buffer memory 220, the packet memory 230, and the output buffer memory 240. Examples of the descriptor information include pointers to the head and tail chunks, described later, of the data stream.

Figure 3A:
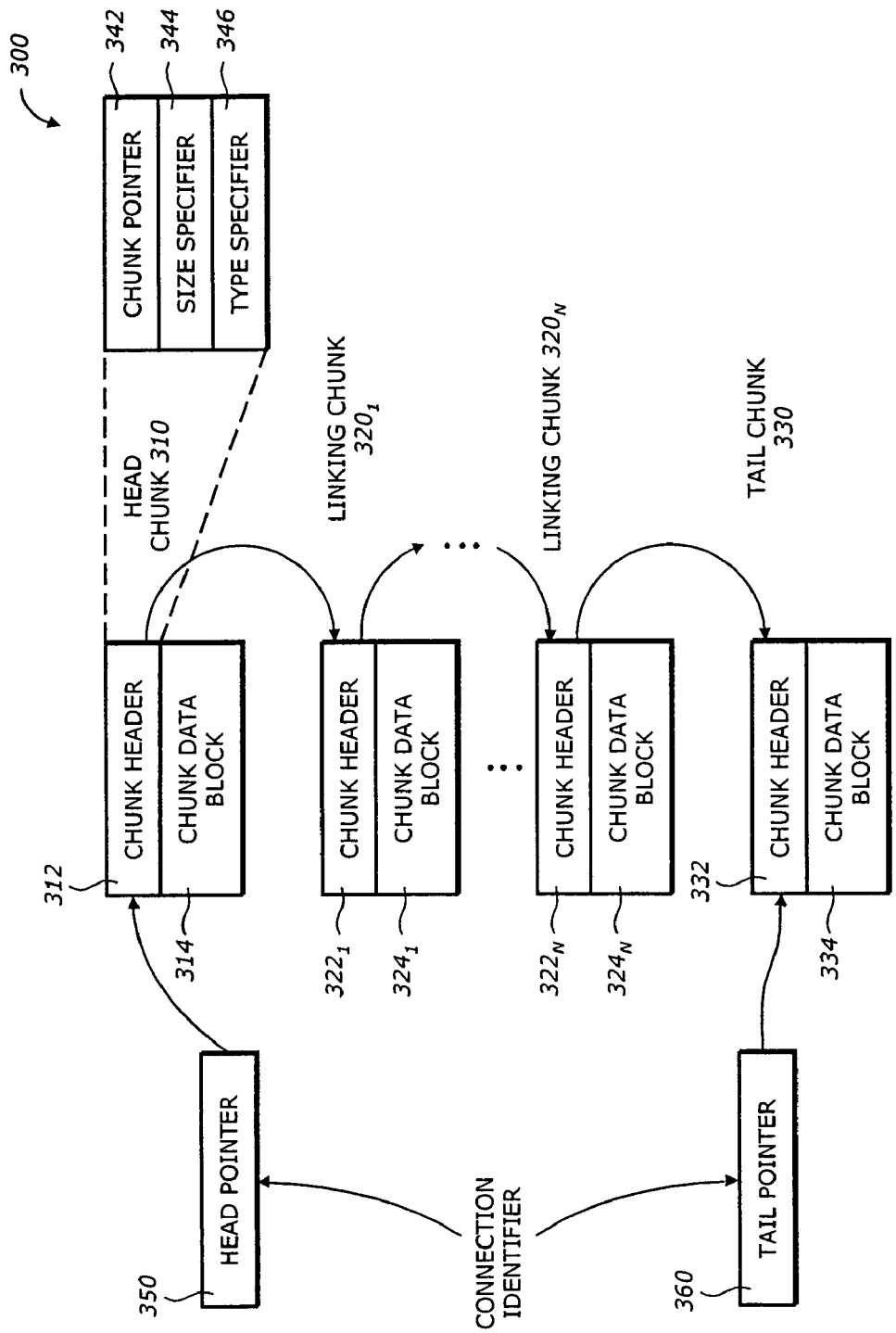
FIG. 3A is a diagram illustrating a linked list used in organizing the data according to one embodiment of the invention.

FIG. 3A is a diagram illustrating a linked list structure 300 used in organizing the data according to one embodiment of the invention. The linked list structure 300 includes a head chunk 310, N linking chunks $320_1$ to $320_N$, a tail chunk 330, a head pointer 350, and a tail pointer 360.

The head chunk 310, the linking chunks $320_1$ to $320_N$, and the tail chunk 330 store data at the beginning, in the middle, and at the end of a data stream. Each of the chunks stores a fixed-size block of data. The tail chunk 330 may contain no data or partially filled block of data depending on the size of the data stream and the size of each chunk. Each of the chunks has a chunk header and a chunk data block. The chunk header contains information about the corresponding chunk and the chunk data block contains the data in the data stream. The head chunk 310 has a chunk header 312 and a chunk data block 314. The linking chunks have chunk headers $322_1$ to $322_N$ and chunk data blocks $324_1$ to $324_N$. The tail chunk 330 has a chunk header 332 and a chunk data block 334.

The chunk-header 312 contains a chunk pointer 342, a size specifier 344, and a type specifier 346. The chunk headers $322_1$ to $322_N$ and 332 contain similar information. Each of the chunk pointers points to, or contains the address of, the next chunk in the linked list of chunks. For example, the chunk pointer 342 points to the linking chunk $320_1$, the linking chunk $320_1$ points to the linking chunk $320_2$, and so on. The chunk pointer in the chunk header 332 may be empty or points to the next data stream. The size specifier 344 specifies the size of the chunk data block. The type specifier 346 specifies the type of the chunk, whether it is of type data, tail or pointer. If a chunk type is data, then the chunk-data block contains actual payload data. If a chunk type is pointer, then the chunk-data block contains pointers to payload data residing in the packet memory. If a chunk type is tail, then the chunk is the last chunk in the linked-list of chunks. Note that no head chunk type need be specified, and that both the data and pointer chunk types need be specified as tail or non-tail so that the hardware to traverse the linked list can terminate its access operation.

The head and tail pointers 350 and 360 point to the head and tail chunks 310 and 330 of a linked list, respectively. The head and tail pointers 350 and 360 are typically stored in the buffer management controller 210 after they are retrieved from the descriptor memory 270 (FIG. 2). The head and tail pointers 350 and 360 are in turn pointed to by the connection identifier 370 associated with a network connection.

Figure 3B:
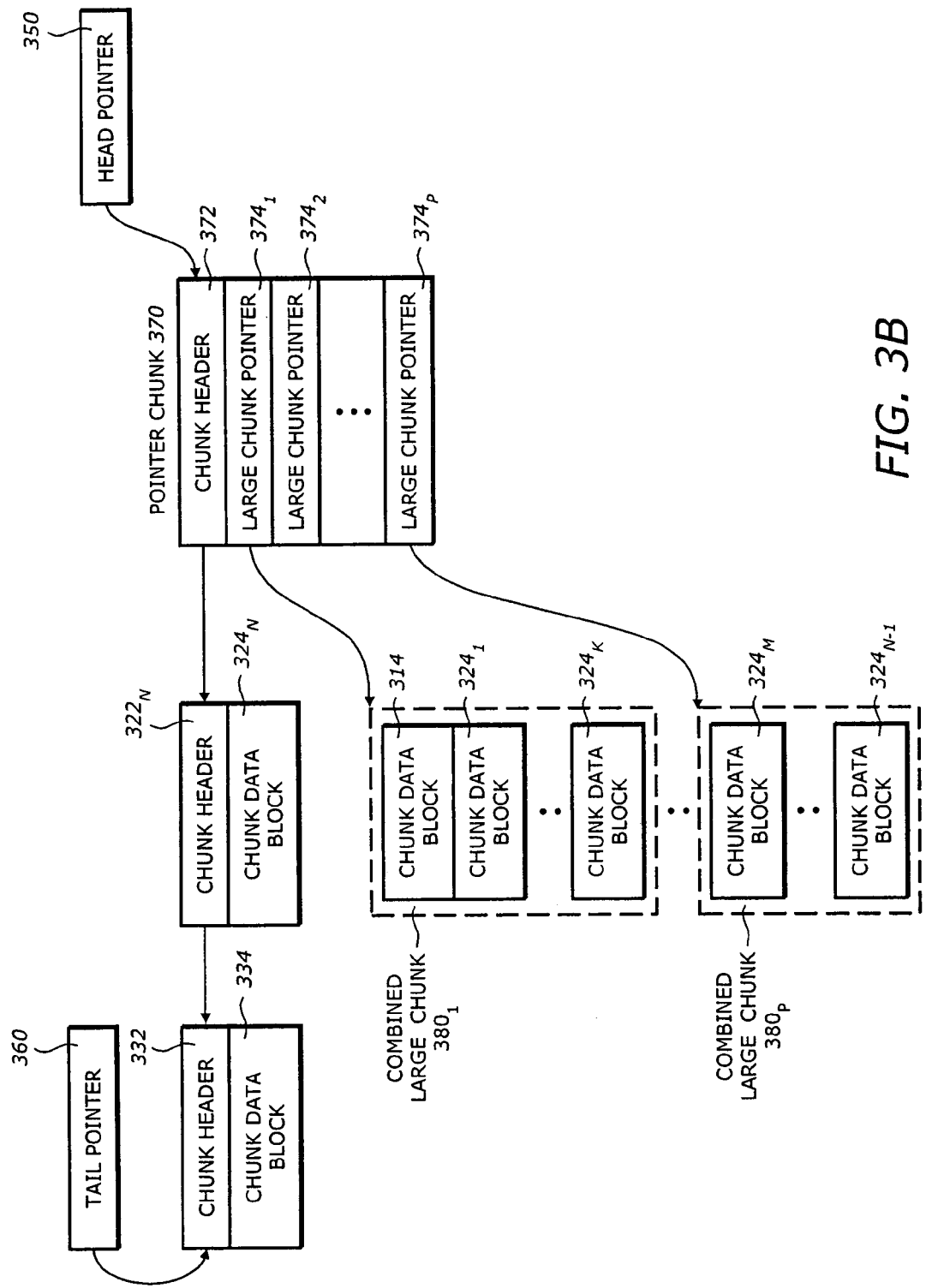
FIG. 3B is a diagram illustrating a collapse operation on the chunks according to one embodiment of the invention.

FIG. 3B is a diagram illustrating a collapse operation on the chunks according to one embodiment of the invention.

The main objective of collapsing the chunks is to speed up data transfer from the input buffer memory 220 to the packet memory 230 (FIG. 2). The individual data chunks 314, $324_1$ to $324_K$ are collapsed, or combined, into larger chunks with appropriate size for burst write to the packet memory 230. By combining the chunk data blocks into larger chunks, the data transfer rate from the input buffer memory 220 to the packet memory 230 can be significantly improved using the burst write mode. In the illustrative example shown in FIG. 3B, chunk data blocks are collapsed into combined large chunks $380_1$ to $380_P$. For example, chunk data block 314, $324_1$ to $324_K$ are combined into a combined large chunk $380_1$, chunk data blocks $324_M$ to $324_{N-1}$ are combined into the combined large chunk $380_P$.

In addition, pointers for the combined large chunks $380_1$ to $380_P$ are created and a pointer chunk 370 is formed. The pointer chunk 370 contains a chunk header 372, and large chunk pointers $374_1$ to $374_P$. The chunk header 372 has a chunk pointer to point to the next linking chunk in the chain, namely the linking chunk $324_N$. The large chunk pointers $374_1$ to $374_P$ point to the combined large chunks $380_1$ to $380_P$, respectively. The pointer chunk 370 is stored in the output buffer memory 240 and the head pointer 350 points to the pointer chunk 370. Note that a suitable data structure may be created so that each of the large chunk pointers contains information on the individual chunk headers for the corresponding chunk data blocks in the combined large chunk. These chunk headers can be later extracted and re-assembled or combined with the corresponding chunk data block as will be explained in FIG. 3C.

Figure 3C:
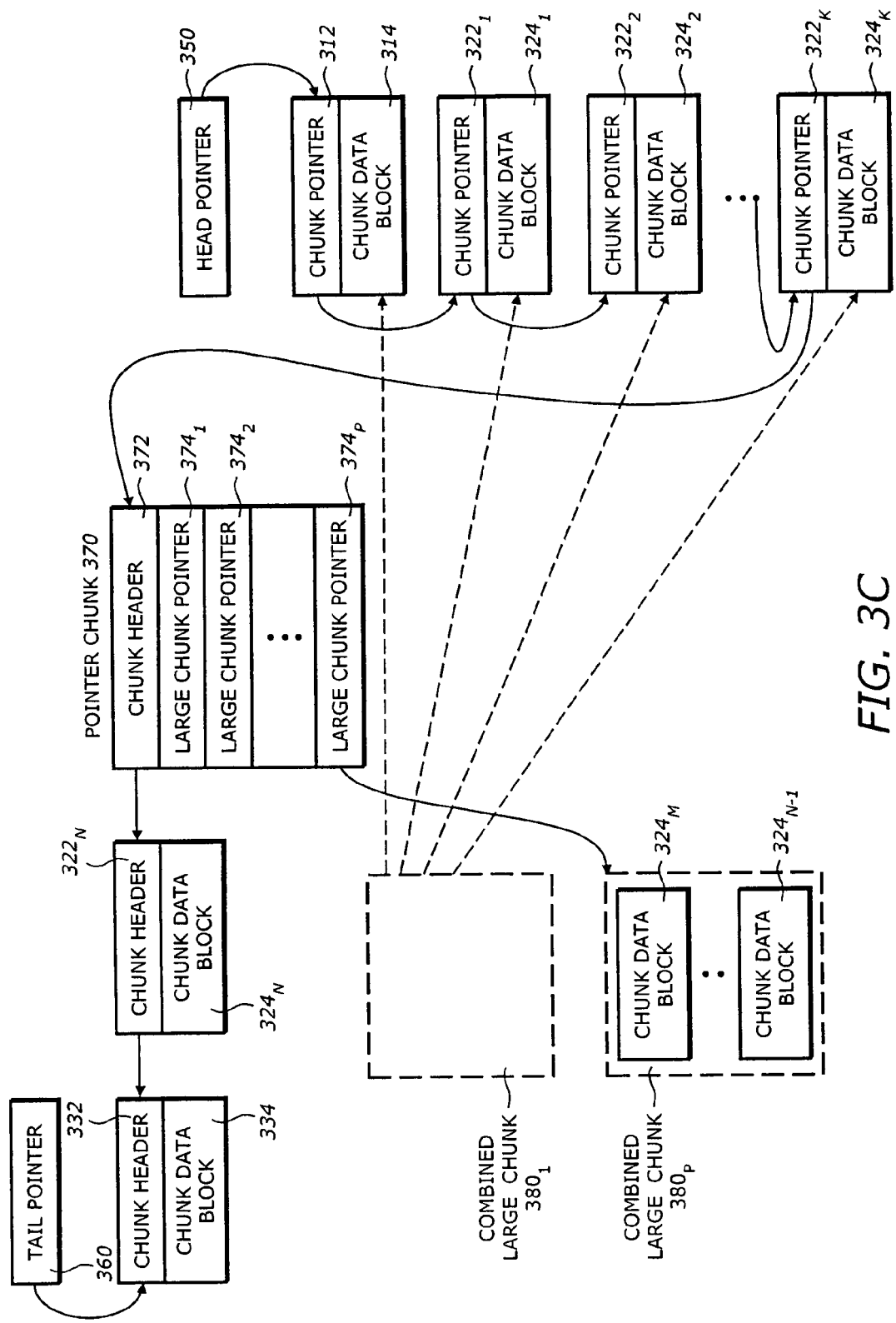
FIG. 3C is a diagram illustrating an expansion operation on the chunks according to one embodiment of the invention.

FIG. 3C is a diagram illustrating an expansion operation on the chunks according to one embodiment of the invention.

The main objective of expanding the chunks is to re-organize the chunk data blocks into appropriate chunks as originally organized while taking advantage of the speed improvement of the burst read of the combined large chunks from the packet memory 230 to the output buffer memory 240 (FIG. 2). Normally, an expansion operation follows a collapse operation. The combined large chunks $380_1$ to $380_P$ are burst read from the packet memory 230 to the output buffer memory 240. The individual chunk headers contained in the data structure within the corresponding large chunk pointer in the pointer chunk 370 are then extracted. Then, while in the output buffer memory 240, the individual chunk data blocks are expanded, or extracted, and combined with the corresponding chunk headers to form the chain of chunks as in the original chain shown in FIG. 3A. For example, the chunk data block 314 is combined with the chunk header 312 to form the head chunk 310 in FIG. 3A, the chunk data block $324_1$ is combined with the chunk header $322_1$ to form the linking chunk $320_1$ in FIG. 3A, etc. The header pointer 350 is now pointing to the chunk header 310 as before.

Figure 4:
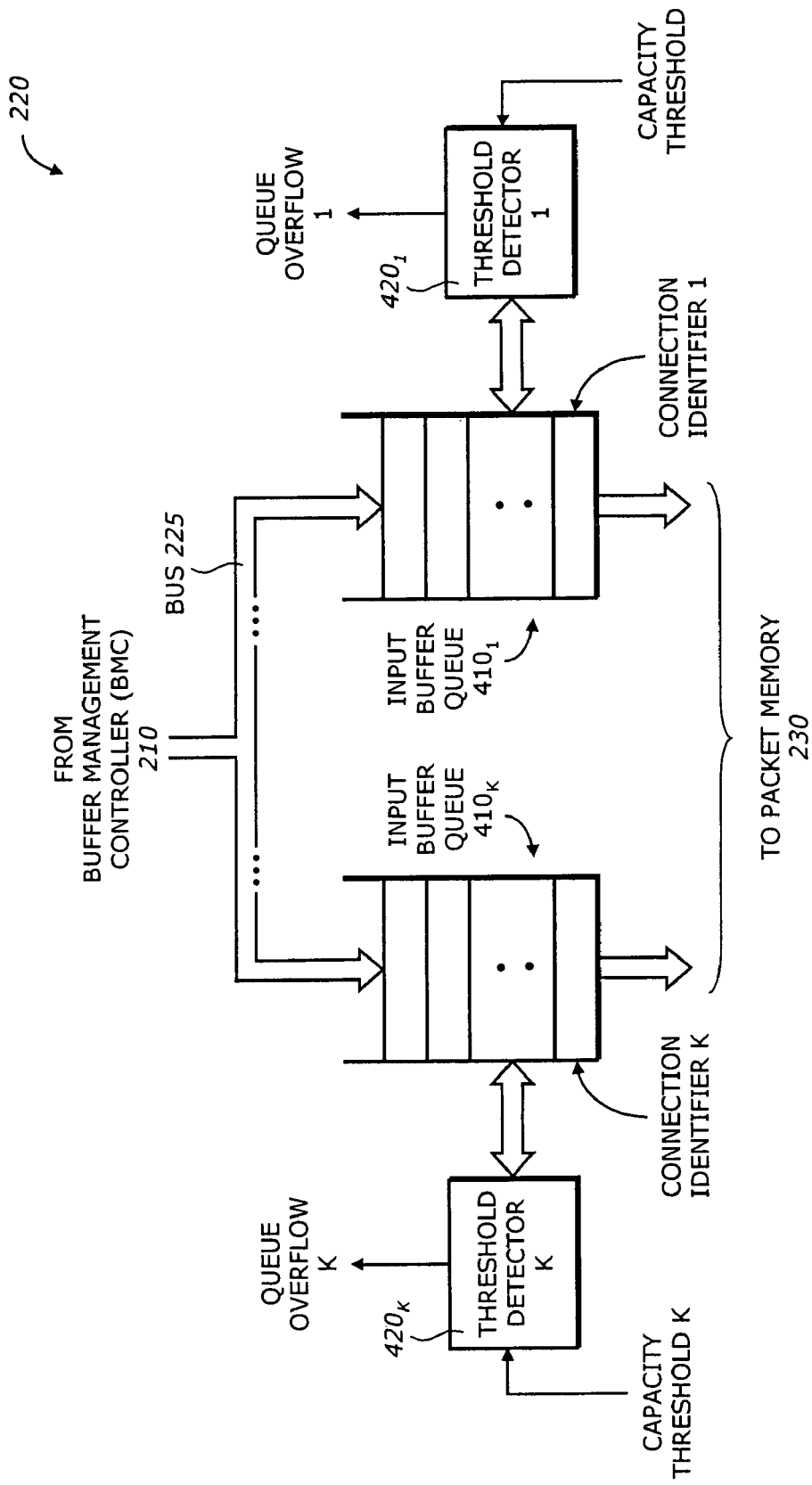
FIG. 4 is a diagram illustrating an input buffer memory according to one embodiment of the invention.

FIG. 4 is a diagram illustrating the input buffer memory 220 shown in FIG. 2 according to one embodiment of the invention. The input buffer memory 220 includes K input buffer queues $410_1$ to $410_K$ and corresponding K threshold detectors $420_1$ to $420_K$.

Each of the K input buffer queues $410_1$ to $410_K$ is associated with a connection identifier. There are K connection identifiers correspond to K input buffer queues $410_1$ to $410_K$. The input buffer queues $410_1$ to $410_K$ contain fixed-size data blocks corresponding to the chunks in the linked list 300 as shown in FIG. 3. A threshold can be set to determine if an overflow is going to occur so that data transfer can be initiated.

Each of the overflow detectors $420_1$ to $420_K$ detects if there is an overflow in the corresponding input buffer queues $410_1$ to $410_K$. Since each input buffer queue has a fixed size, whenever the number of data being transferred approaches the limit, the overflow detector generates an overflow indicator or flag, signifying a transfer condition for data transfer to the packet memory 230. The transfer of data from each of the K input buffer queues $410_1$ to $410_K$ to the packet memory 230 is performed by a burst write using the burst write mode of the SDRAM.

Figure 5:
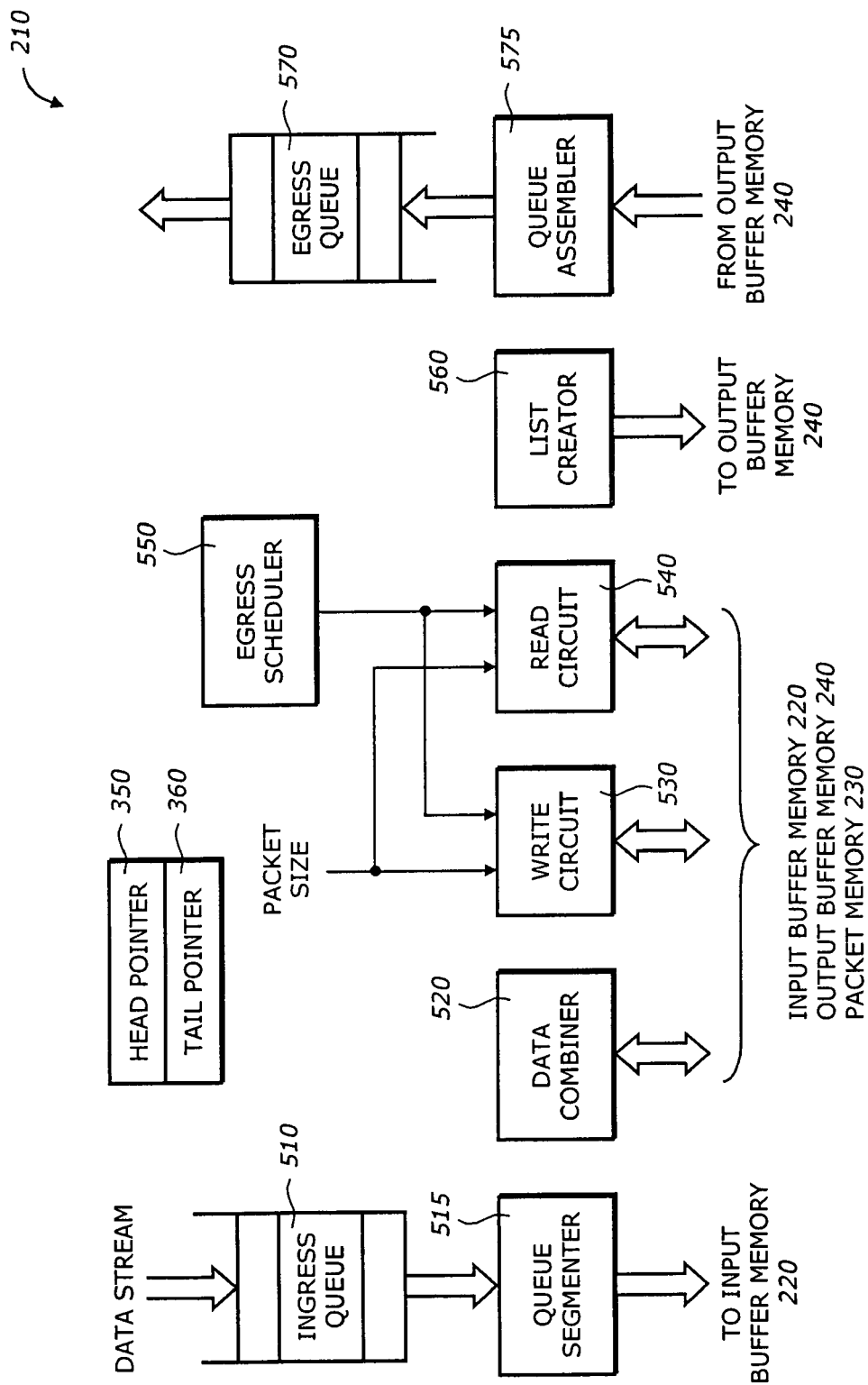
FIG. 5 is a diagram illustrating a controller according to one embodiment of the invention.

FIG. 5 is a diagram illustrating a controller 210 according to one embodiment of the invention. The controller 210 includes the head and tail pointers 350 and 360, an ingress queue 510, a queue segmenter 515, a data combiner 520, a write circuit 530, a read circuit 540, a egress scheduler 550, a list creator 560, an egress queue 570, and an egress queue assembler 575.

The head and tail pointers 350 and 360 are used to point to the head and tail chunks corresponding to the input buffer queues in the input buffer memory 220 according to the linked list 300 illustrate in FIG. 3A. The head and tail pointers 350 and 360 are updated each time data from the input buffer queue are burst written to the packet memory 230.

The ingress queue 510 buffers the data stream coming from the ingress of the channel on the input data path. The ingress queue 510 acts as a temporary storage for the data stream before being loaded into the input buffer memory 220. The queue segmenter 515 slices the data from the ingress queue 510 into blocks of data of fixed size so that they can be transferred to the input buffer queues of the input buffer memory 220.

The data combiner 520 combines the chunk data blocks in the input buffer queues to form a contiguous data block to be burst written into the packet memory 230 when a transfer condition occurs such as a queue threshold overflow. By combining the chunk data blocks into a large chunk of data, the data transfer can be efficiently performed using the burst write mode of the SDRAM. This operation is the collapse operation as explained in FIG. 3B.

The write circuit 530 performs a burst write of the combined data block into the packet memory 230. The write circuit 530 receives the packet size to determine what transfer mode to be performed. For a long packet, the write circuit 530 writes to the packet memory 230 and then to the output buffer memory 240. For a short packet, the write circuit 530 writes directly to the output buffer memory 240 bypassing the packet memory 230. In addition, the write circuit 530 receives a command signal from the egress scheduler 550 to perform the burst write.

The read circuit 540 performs a burst read of the combined data block from the packet memory 230 to the output buffer memory 240. This operation is the expansion operation as explained in FIG. 3C. The read circuit 540 receives the packet size to determine what transfer mode to be performed. For a long packet, the read circuit 540 read from the packet memory 230. For a short packet, the read circuit 540 reads directly from the input buffer memory 220 bypassing the packet memory 230. In addition, the read circuit 540 receives a command signal from the egress scheduler 550 to perform the burst read.

The egress scheduler 550 schedules the egress data demand according to network traffic. When there is a demand for data transfer, the egress scheduler 550 generates a command signal to the read circuit 540 to initiate a data transfer to the egress.

The list creator 560 creates an ordered list of pointers associated with the chunk headers of the chunks that are transferred from the input buffer memory 220 to the packet memory 230. The ordered list of pointers are transferred to the output buffer memory 240 to form a pointer chunk as explained in FIG. 3C. Essentially, the list creator 560 extracts the chunk pointers from the chunks when the chunks are transferred from the input buffer memory 210 to the packet memory 220.

The egress queue 570 buffers the data to be sent to the egress of the channel. The queue assembler 575 receives data from the output buffer memory 240 and assembles the data into proper format to be loaded into the egress queue 570.

Figure 6:
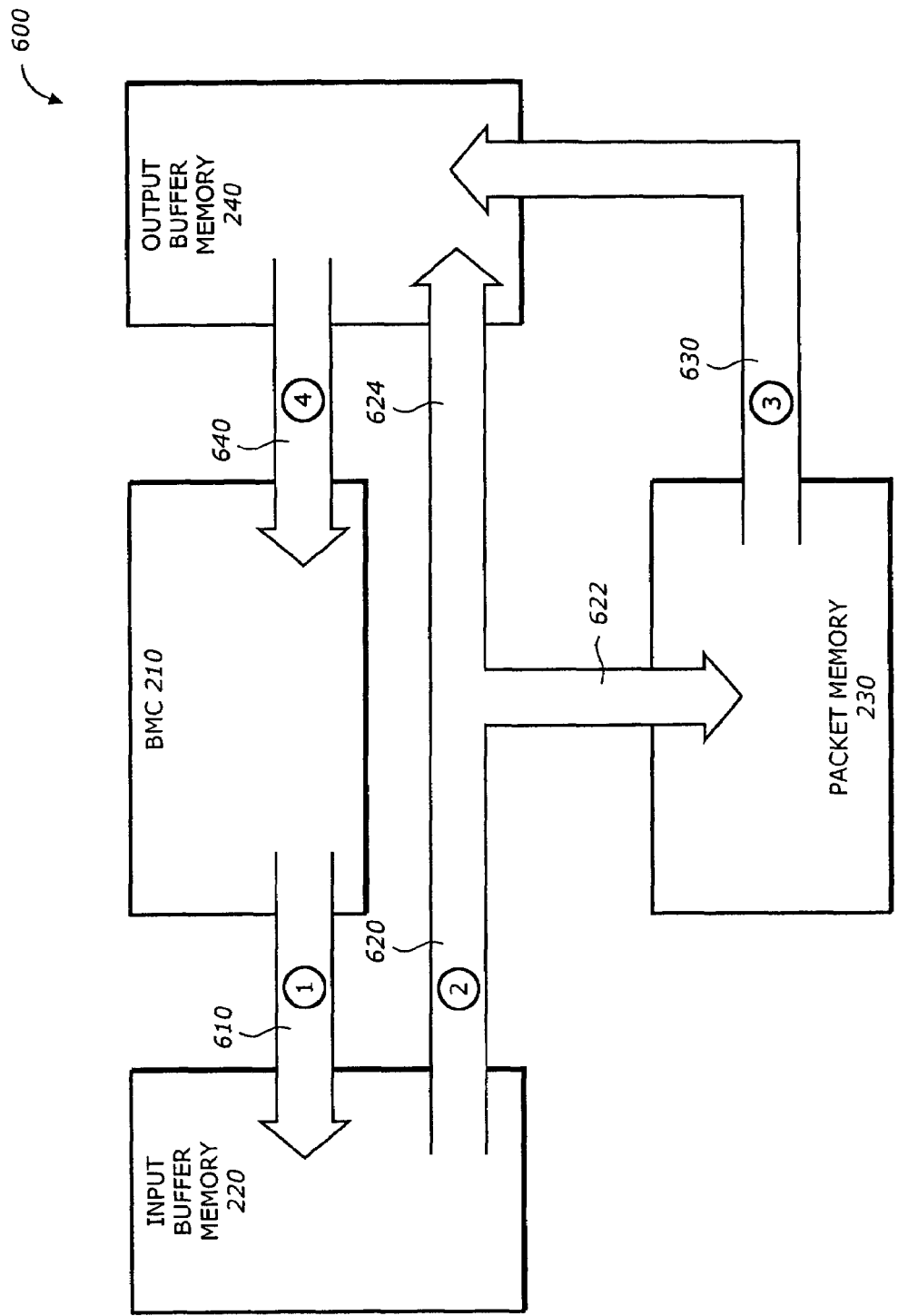
FIG. 6 is a diagram illustrating a data transfer for long packets according to one embodiment of the invention.

FIG. 6 is a diagram illustrating a data transfer 600 for long packets according to one embodiment of the invention. The data transfer 600 includes transfer paths 610, 620, 630 and 640, respectively.

The data transfer for long packets takes place in four basic ordered steps: steps 1, 2, 3, and 4. The steps 1, 2, 3, and 4 correspond to the transfer paths 610, 620, 630, and 640.

First, in step 1, data are transferred via the transfer path 610 from the buffer management controller 210 to the input buffer memory 220. The data are organized according to the linked list structure into chunks by the queue segmenter 515 as shown in FIG. 5. These data chunks are loaded into the input buffer queues $410_1$ to $410_K$ according to the connection identifiers as shown in FIG. 4. In a normal network flow, incoming data for each network connection may arrive a regular rate at any time. The buffer management controller 210 determines the connection identifier associated with the connection and transfers the data to the corresponding input buffer queue in the input buffer memory 220. The amount of data loaded into the input buffer queue is determined to see if the queue threshold has been approached, or if overflow is going to occur. The buffer management controller 210 also determines if the packet is long or short so that the appropriate transfer mode can be used for efficient transfer. Since there is some overhead involved in transferring data via the packet memory 230, it is more efficient to transfer data directly to the output buffer memory 240 for short packets.

Second, in step 2, the data in the input buffer queue 220 are transferred to the packet memory 230 and/or the output buffer memory 240 via a transfer path 620 when a transfer condition occurs. This transfer condition may be a request for data from the egress scheduler 550. The transfer path 620 includes transfer subpaths 622 and 624. The transfer subpath 622 corresponds to data transfer from the input buffer memory 220 to the packet memory 230. The transfer subpath 624 corresponds to data transfer from the input buffer memory 220 directly to the output buffer memory 240. The data blocks of the chunks in the input buffer queue are combined by the data combiner 520 in the buffer management controller 210 as shown in FIG. 5. The combined data block is then burst written into the packet memory 230 via the transfer subpath 622 when a transfer condition occurs. An ordered list of pointers is transferred to the output buffer memory 240. This list contains pointers to the newly created large data chunks stored in the packet memory illustrated in FIG. 3. The head pointer is now updated to point to the chunk pointer of the head chunk now located in the output buffer memory 240. This step corresponds to the collapse operation as shown in FIG. 3B.

Third, in step 3, the combined data block from the packet memory 230 is burst read to the output buffer memory 240 via transfer path 630 when a transfer condition occurs. This transfer condition may be provided by the egress scheduler. Again, this burst read provides efficient data transfer. The combined data block is now stored in the output buffer memory 240 according to its connection identifier. The individual chunk data blocks are extracted from the combined data block and prepended with the corresponding chunk headers to form a linked list of chunks as originally organized. This step corresponds to the expansion operation as shown in FIG. 3C.

Fourth, in step 4, the data block is transferred to the buffer management controller 210 to be sent to the egress of the channel. The data block may be reorganized so that only actual data are sent. Chunk information such as header, size and type specifiers are not needed and removed.

Figure 7:
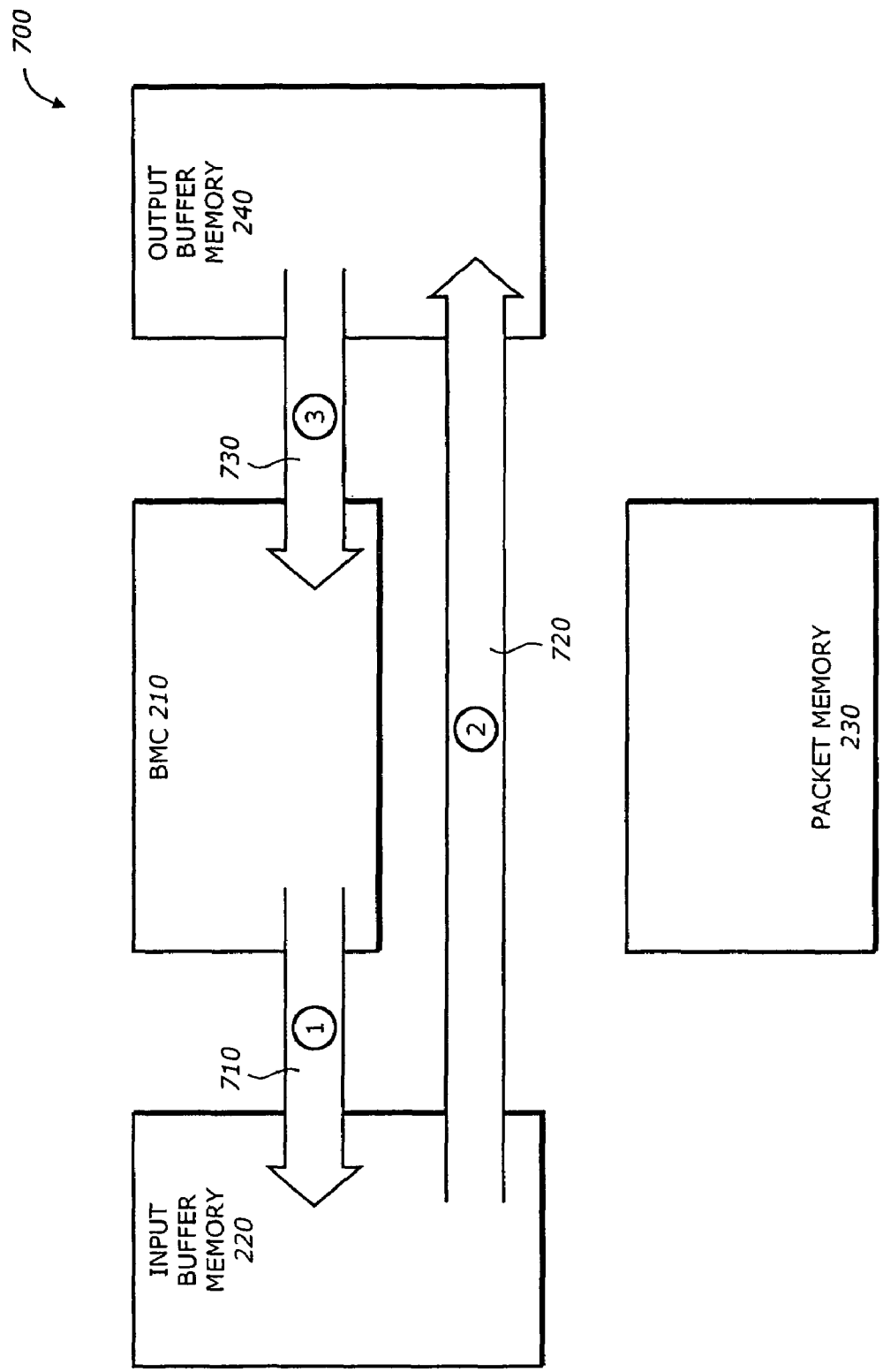
FIG. 7 is a diagram illustrating a data transfer for short packets according to one embodiment of the invention.

FIG. 7 is a diagram illustrating a data transfer 700 for short packets according to one embodiment of the invention. The data transfer 700 includes transfer paths 710, 720, and 730.

The data transfer for short packets takes place in three basic ordered steps: steps 1, 2, and 3. The steps 1, 2, and 3 correspond to the transfer paths 710, 720, and 730, respectively.

First, in step 1, data are transferred via the transfer path 710 from the buffer management controller 210 to the input buffer memory 220 in much the same way as shown in FIG. 6.

Second, the data are transferred to the output buffer memory 240 via the transfer path 720, bypassing the packet memory 230 when a transfer condition occurs. The head pointer is updated to point to the corresponding chunk located in the output buffer memory 240. Since the packet size is small, the transfer rate can be fast without the need of going through the packet memory 230.

Third, in step 3, the data are transferred from the output buffer memory 240 to the buffer management controller 210 (FIG. 1) via path 730. This step is similar to the step illustrated in FIG. 6.

Figure 8A:
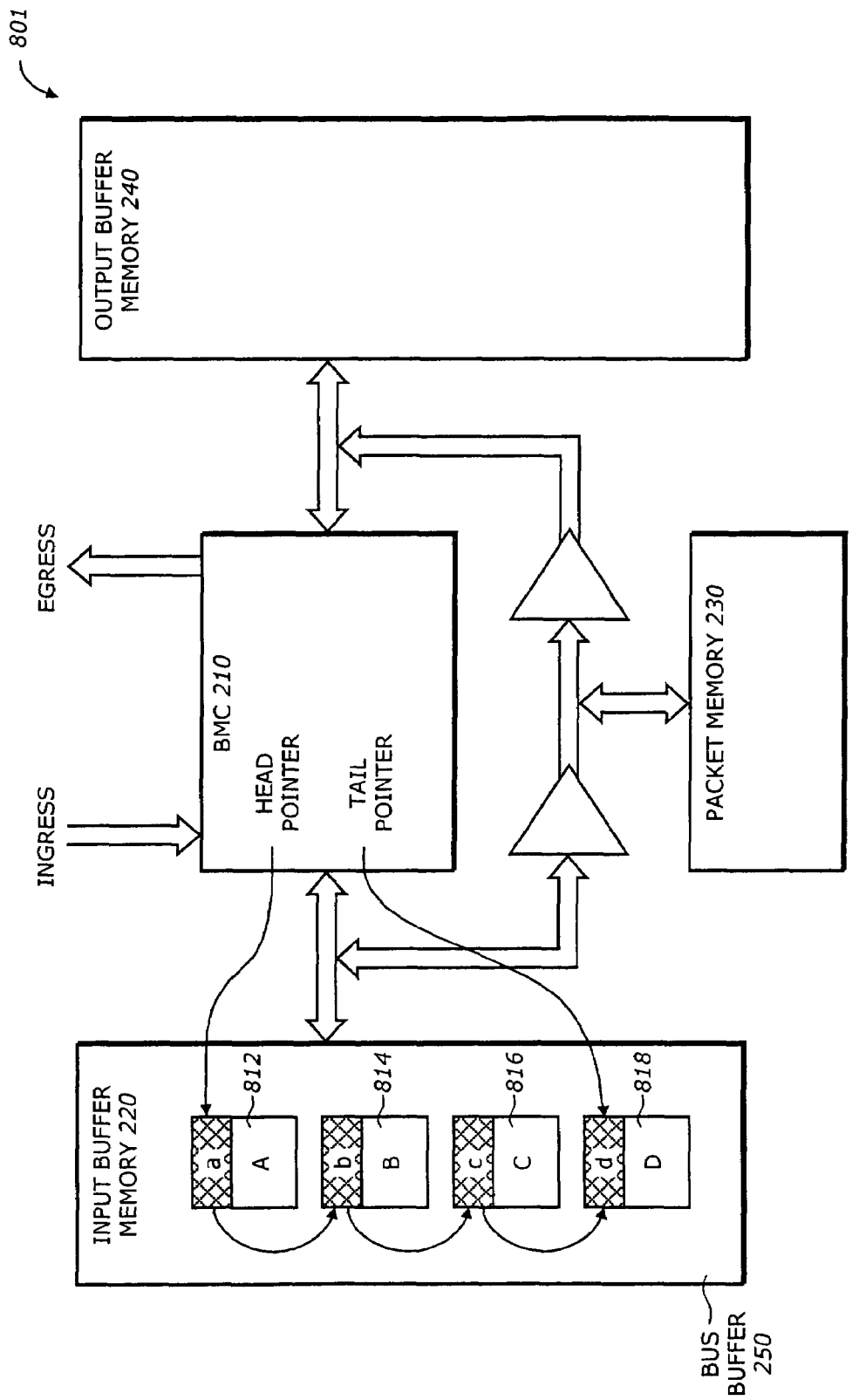
FIG. 8A is a diagram illustrating a data transfer path to the input buffer memory for long packets according to one embodiment of the invention.

FIG. 8A is a diagram illustrating a data transfer path 801 to the input buffer memory for long packets according to one embodiment of the invention.

The data transfer path 801 corresponds to step 1 as shown in FIG. 6. The data organized into a linked list. In the illustrative example shown in FIG. 8A, there are four chunks A, B, C, and D (812, 814, 816, and 818) where chunk A 812 is the head chunk, chunk D 818 is the tail chunk, and chunks C and D, 814 and 816 are linking chunks. The header and tail pointers point to the header chunk 812 and 818, respectively.

Figure 8B:
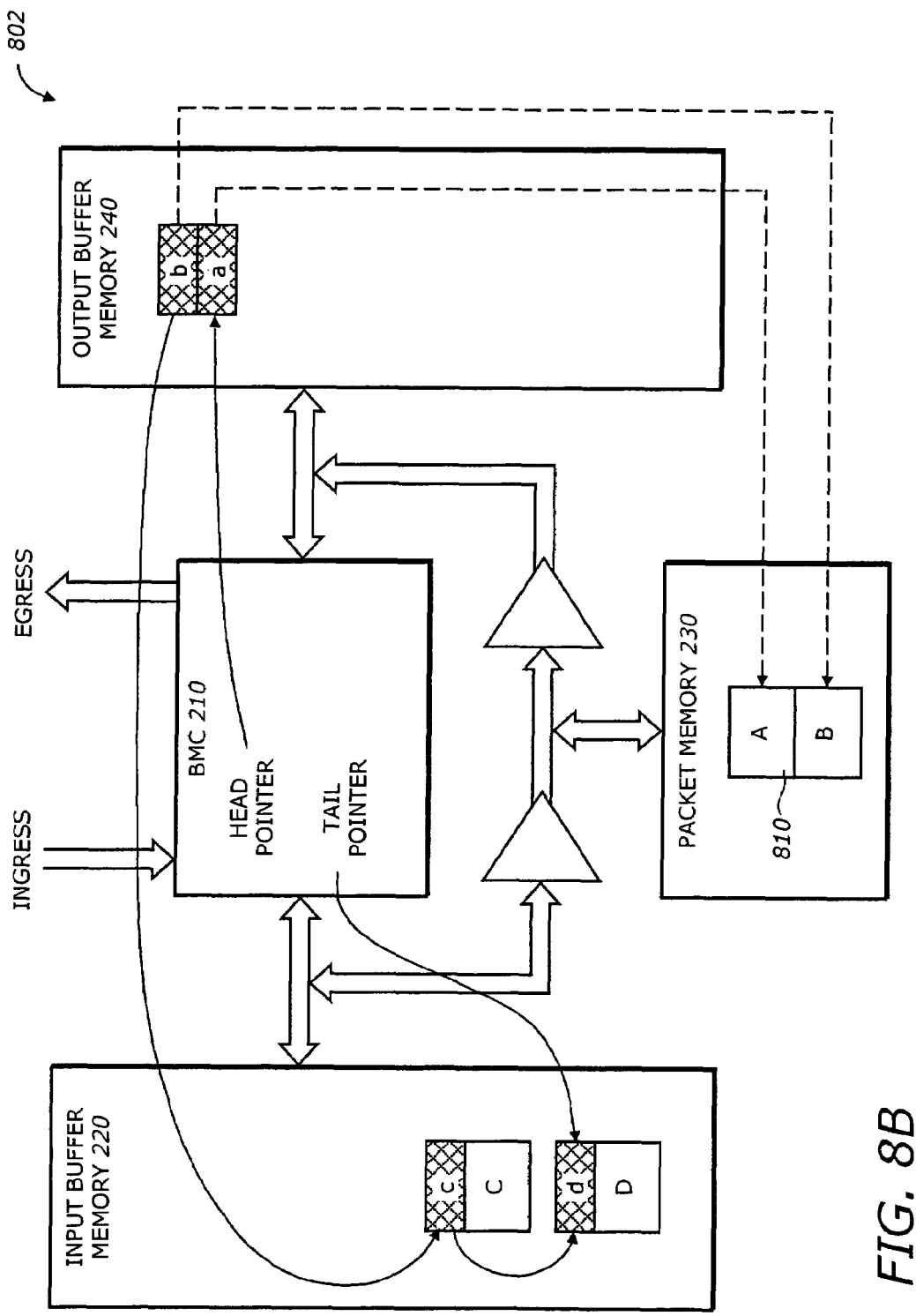
FIG. 8B is a diagram illustrating a data transfer path to the packet memory and the output buffer memory for long packets according to one embodiment of the invention.

FIG. 8B is a diagram illustrating a data transfer path 802 to the packet memory and the output buffer memory for long packets according to one embodiment of the invention.

The data transfer path 802 corresponds to step 2 as shown in FIG. 6. Each of the chunks is split into a chunk header and a chunk data block. In this example, suppose chunks A and B are transferred. The data combiner 520 in the buffer management controller 210 combines the data blocks to form a large combined data block 810 including the chunk data blocks A and B. The list of pointers including chunk pointers a and b is sent to the output buffer memory 240. The head and tail pointers are updated to point to the corresponding chunks now in the output buffer memory 240 As shown in FIG. 8B, the chunk pointers a and b in the output buffer memory 240 point to the data blocks A and B in the packet memory 230, respectively. The data transfer path 802 corresponds to the collapse operation shown in FIG. 3B.

Figure 8C:
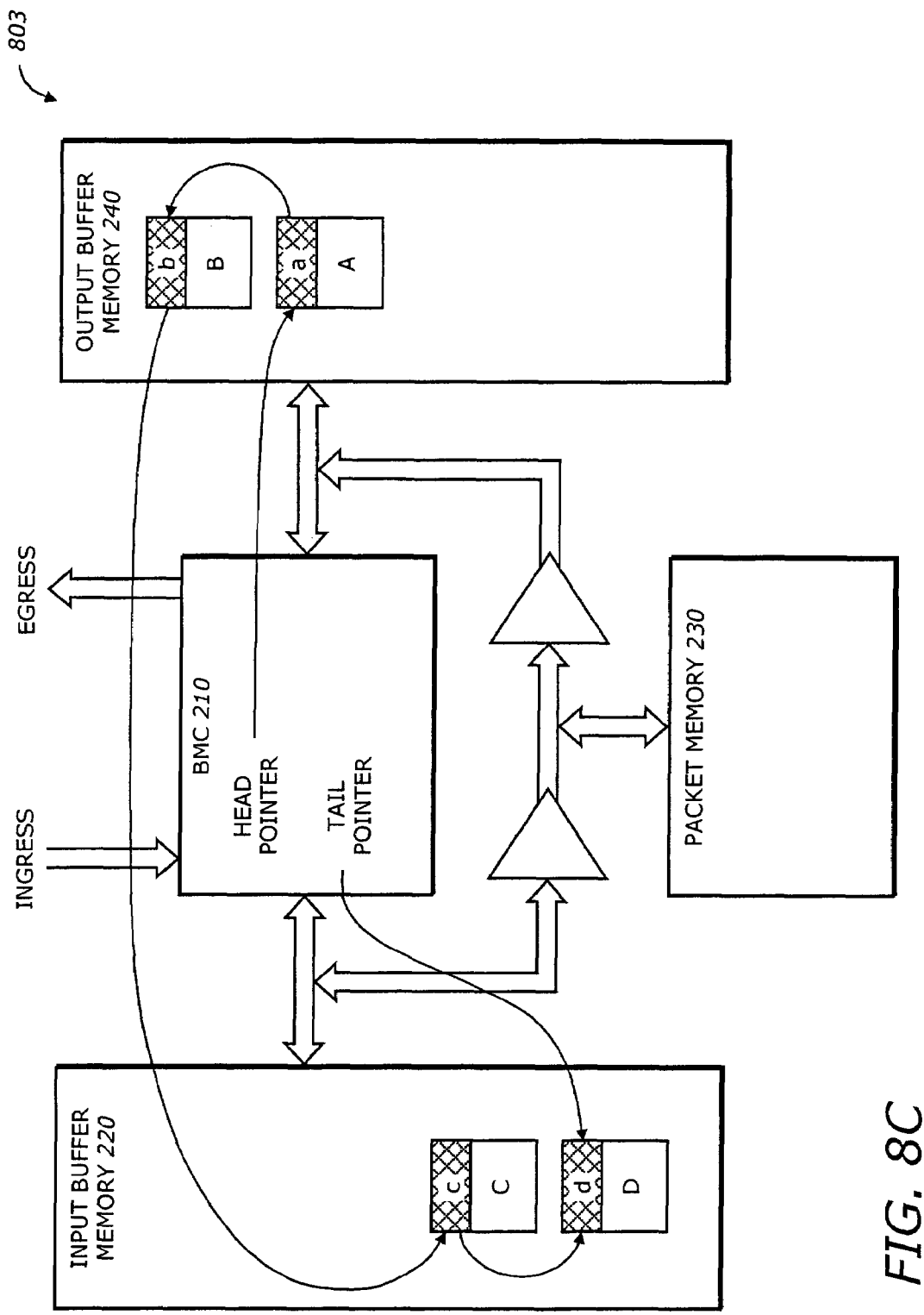
FIG. 8C is a diagram illustrating a data transfer path for the data blocks to the output buffer memory for long packets according to one embodiment of the invention.

FIG. 8C is a diagram illustrating a data transfer path 803 for the data blocks to the output buffer memory for long packets according to one embodiment of the invention.

The data transfer path 803 corresponds to step 3 as shown in FIG. 6. The combined data block is burst read from the packet memory 230 to the output buffer memory 240. Since a larger data block is read using the read burst mode, the data transfer can be made more efficient. In the output buffer memory 240, the combined data blocks are split up to associate with the corresponding chunk pointers. For example, data block A is merged with chunk pointer a. The data transfer path 803 corresponds to the expansion operation shown in FIG. 3C.

Figure 8D:
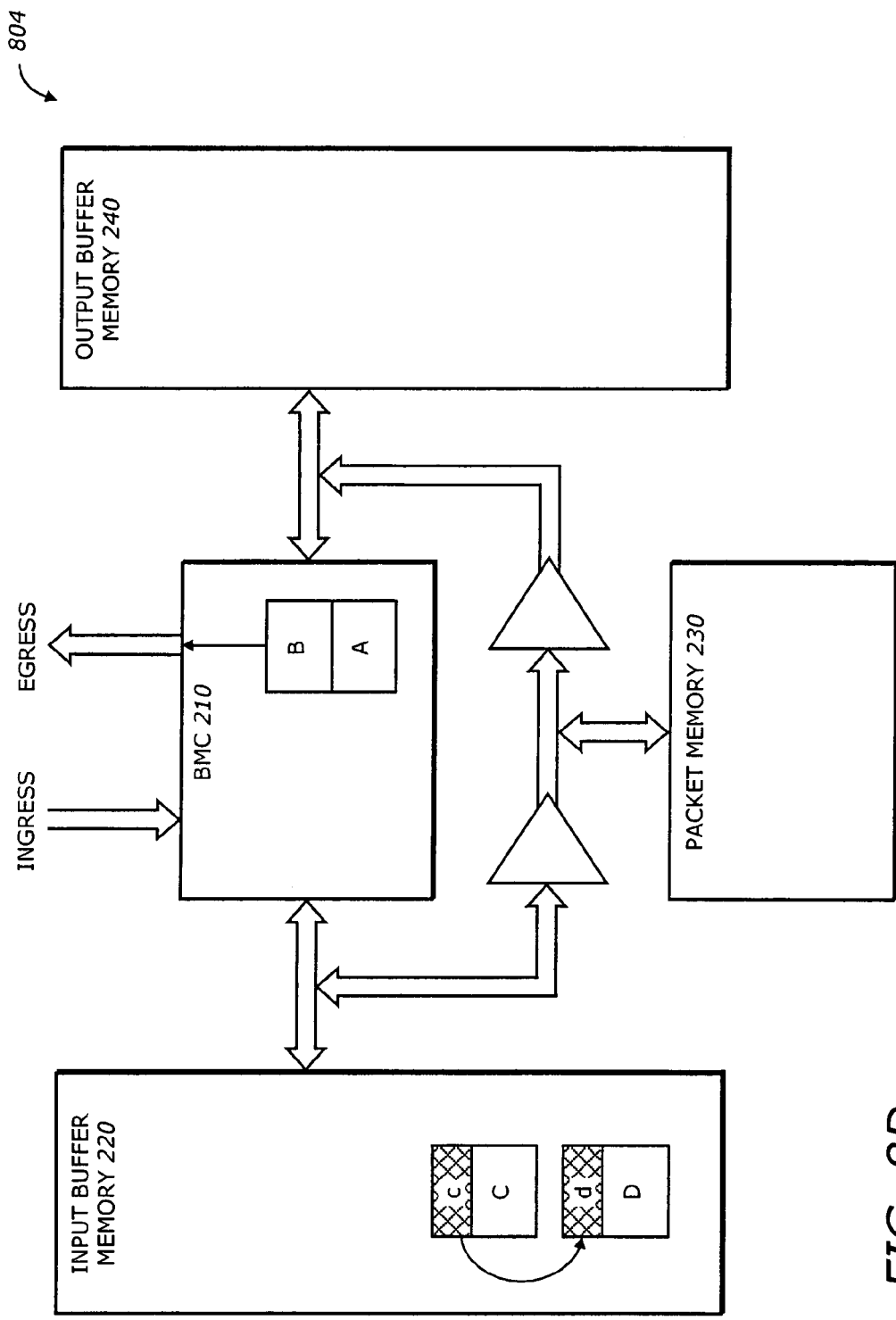
FIG. 8D is a diagram illustrating a data transfer path to the controller for long packets according to one embodiment of the invention.

FIG. 8D is a diagram illustrating a data transfer path 804 to the controller for long packets according to one embodiment of the invention.

The data transfer path 804 corresponds to step 4 as shown in FIG. 6. The data blocks A and B are sent from the output buffer memory 240 to the buffer management controller 210. The data blocks are assembled and organized into proper format by the queue assembler 575 before loading into the egress queue 570 as shown in FIG. 5.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
    a first buffer memory of a first type to store data associated with a connection identifier corresponding to a channel in a network, the data being organized into at least one chunk based on a linked list, the at least one chunk comprising at least one chunk data block, the connection identifier identifying a connection in the channel, the data being part of a data stream of a packet associated with the connection, the packet having a defined packet size;
    a packet memory of a second type coupled to the first buffer memory and configured to store the at least one chunk data block;
    a second buffer memory of the first type coupled to the first buffer memory and the packet memory, and configured to store the at least one chunk data block; and
    a write circuit (i) to write the at least one chunk data block to the packet memory in response to a transfer condition if the packet size indicates the packet is long, and (ii) to write the at least one chunk data block to the second buffer memory in response to the transfer condition if the packet size indicates the packet is short.

2. The apparatus of claim 1 further comprising:
    a descriptor memory to store descriptor information corresponding to the at least one chunk; and
    a controller coupled to the descriptor memory and the first buffer memory to control data transfer between the first buffer memory and the packet memory using the descriptor information.

3. The apparatus of claim 2 wherein the at least one chunk further comprises:
    a chunk header to store chunk information associated with the linked list.

4. The apparatus of claim 3 wherein the chunk information includes at least one of a pointer to point to one other chunk, a size specifier to specify size of the at least one chunk, and a type specifier to specify type of the at least one chunk.

5. The apparatus of claim 4 wherein the at least one chunk is one of a head chunk corresponding to one end of the data stream, a linking chunk corresponding to an intermediate portion of the data stream, and a tail chunk corresponding to one other end of the data stream.

6. The apparatus of claim 5 wherein the descriptor information includes at least one of head and tail pointers, the head and tail pointers pointing to the head and tail chunks, respectively.

7. The apparatus of claim 6 wherein the connection identifier points to one of the head and tail pointers.

8. The apparatus of claim 2 wherein the controller comprises:
    an ingress queue to buffer the data stream of the packet from an ingress of the channel; and
    a queue segmenter to chunk the data stream into the at least one chunk.

9. The apparatus of claim 8 wherein the first buffer memory comprises an input buffer memory to store the at least one chunk transferred from the queue segmenter.

10. The apparatus of claim 9 wherein the input buffer memory comprises a queue associated with the connection identifier, the queue having a threshold and being configured to store the at least one chunk.

11. The apparatus of claim 10 wherein the transfer condition includes at least one of an overflow of the threshold, the packet size, and a scheduled egress request.

12. The apparatus of claim 11 wherein the controller further comprises:
    a data combiner to combine the chunk data block of one chunk with the chunk data block of at least one other chunk in the input buffer memory;
    wherein the write circuit (i) writes the combined chunk data block to the packet memory if the packet size indicates the packet is long, the combined chunk data block forming a contiguous data block in the packet memory, and (ii) writes the combined chunk data block to the second buffer memory if the packet size indicates the packet is short.

13. The apparatus of claim 12 wherein the controller further comprises:
    a list creator to create an ordered list of pointers associated with chunk headers of the one and the at least one other chunk, the ordered list of pointers being transferred to the second buffer memory of the first type at a location pointed to by a head pointer;
    a read circuit to burst transfer the contiguous data block from the packet memory to the second buffer memory using the ordered list of pointers in the second buffer memory if the packet size indicates the packet is long; and
    an egress queue to buffer the contiguous data block transferred from the second buffer memory.

14. The apparatus of claim 13 wherein the first type is a static random access memory and the second type is a synchronous dynamic random access memory.

15. The apparatus of claim 14 wherein the input buffer memory and the second buffer memory have same sizes.

16. The apparatus of claim 14 wherein the input buffer memory and the second buffer memory have different sizes.

17. A method comprising:
    storing data associated with a connection identifier corresponding to a channel in a network in a first buffer memory of a first type, the data being organized into at least one chunk based on a linked list, the at least one chunk comprising at least one chunk data block the connection identifier identifying a connection in the channel, the data being part of a data stream of a packet associated with the connection, the packet having a defined packet size; and
    writing the at least one chunk data block (i) to a packet memory of a second type in response to a transfer condition if the packet size indicates the packet is long and (ii) to a second buffer memory of the first type in response to a transfer condition if the packet size indicates the packet is short.

18. The method of claim 17 further comprises:
    storing descriptor information corresponding to the at least one chunk in a descriptor memory; and
    controlling data transfer between the first buffer memory and the packet memory using the descriptor information.

19. The method of claim 18 wherein storing the data comprises:
    storing chunk information associated with the linked list in a chunk header.

20. The method of claim 19 wherein the chunk information includes at least one of a pointer to point to one other chunk, a size specifier to specify size of the at least one chunk, and a type specifier to specify type of the at least one chunk.

21. The method of claim 20 wherein the at least one chunk is one of a head chunk corresponding to one end of the data stream, a linking chunk corresponding to an intermediate portion of the data stream, and a tail chunk corresponding to one other end of the data stream.

22. The method of claim 21 wherein the descriptor information includes at least one of head and tail pointers, the head and tail pointers pointing to the head and tail chunks, respectively.

23. The method of claim 22 wherein the connection identifier points to one of the head and tail pointers.

24. The method of claim 18 wherein controlling the data transfer comprises:
    buffering the data stream of the packet from an ingress of the channel by an ingress queue; and
    segmenting the data stream into the at least one chunk.

25. The method of claim 24 wherein storing the data comprises storing the at least one chunk transferred from the queue segmenter in an input buffer memory.

26. The method of claim 25 wherein storing the at least one chunk in the input buffer memory comprises storing the at least one chunk in a queue associated with the connection identifier, the queue having a threshold.

27. The method of claim 26 wherein the transfer condition includes at least one of an overflow of the threshold, the packet size, and a scheduled egress request.

28. The method of claim 27 wherein controlling the data transfer further comprises:
    combining the chunk data block of one chunk with the chunk data block of at least one other chunk in the input buffer memory.

29. The method of claim 28 wherein controlling the data transfer further comprises:
    creating an ordered list of pointers associated with the chunk headers of the one and the at least one other chunk, the ordered list of pointers being transferred to the second buffer memory of the first type at a location pointed to by the head pointer;
    burst transferring a contiguous data block from the packet memory to the second buffer memory using the ordered list of pointers in the second buffer memory when the packet size indicates the packet is long; and
    buffering the contiguous data block transferred from the second buffer memory in an egress queue.

30. The method of claim 29 wherein the first type is a static random access memory and the second type is a synchronous dynamic random access memory.

31. The method of claim 29 wherein the input buffer memory and the second buffer memory have same sizes.

32. The method of claim 29 wherein the input buffer memory and the second buffer memory have different sizes.

33. A system comprising:
    a channel in a network having an ingress and egress;
    a data buffer circuit coupled to the channel to buffer data transmitted over the channel, the data buffer circuit comprising:
        an input buffer memory of a first type to store data associated with a connection identifier corresponding to the channel, the data being organized into at least one chunk based on a linked list, the at least one chunk comprising at least one chunk data block, the connection identifier identifying a connection in the channel, the data being part of a data stream of a packet associated with the connection, the packet having a defined packet size,
        an output buffer memory of the first type to store the data transferred from the input buffer memory, and
        a packet memory of a second type coupled to the input and output buffer memories; and
        a write circuit (i) to write the at least one chunk data block to the packet memory in response to a transfer condition if the packet size indicates the packet is long, and (ii) to write the at least one chunk data block to the output buffer memory in response to the transfer condition if the packet size indicates the packet is short.

34. The system of claim 33 wherein the data buffer circuit further comprises:
    a descriptor memory to store descriptor information corresponding to the at least one chunk; and
    a controller coupled to the descriptor memory and the input and output buffer memories to control data transfer between the buffer memories and the packet memory using the descriptor information.

35. The system of claim 34 wherein the at least one chunk further comprises:
    a chunk header to store chunk information associated with the linked list.

36. The system of claim 35 wherein the chunk information includes at least one of a pointer to point to one other chunk, a size specifier to specify size of the at least one chunk, and a type specifier to specify type of the at least one chunk.

37. The system of claim 36 wherein the at least one chunk is one of a head chunk corresponding to one end of the data stream, a linking chunk corresponding to an intermediate portion of the data stream, and a tail chunk corresponding to one other end of the data stream.

38. The system of claim 37 wherein the descriptor information includes at least one of head and tail pointers, the head and tail pointers pointing to the head and tail chunks, respectively.

39. The system of claim 38 wherein the connection identifier points to one of the head and tail pointers.

40. The system of claim 34 wherein the controller comprises:
an ingress queue to buffer the data stream of the packet from the ingress of the channel; and
a queue segmenter to chunk the data stream into the at least one chunk.

41. The system of claim 40 wherein the input buffer memory stores the at least one chunk transferred from the queue segmenter.

42. The system of claim 41 wherein the input buffer memory comprises a queue associated with the connection identifier, the queue having a threshold and being configured to store the at least one chunk.

43. The system of claim 34 wherein the transfer condition includes at least one of an overflow of the threshold, the packet size, and a scheduled egress request.

44. The system of claim 43 wherein the controller further comprises:
a data combiner to combined the chunk data block of one chunk with the chunk data block of at least one other chunk in the input buffer memory;
wherein the write circuit (i) writes the combined chunk data block to the packet memory if the packet size indicates the packet is long, the combined chunk data block forming a contiguous data block in the packet memory, and (ii) writes the combined chunk data block to the output buffer memory if the packet size indicates the packet is short.

45. The system of claim 42 wherein the controller further comprises:
a list creator to create an ordered list of pointers associated with chunk headers of the one and the at least one other chunk, the ordered list of pointers being transferred to the output buffer memory of the first type at a location pointed to by a head pointer;
a read circuit to burst transfer the contiguous data block from the packet memory to the output buffer memory using the ordered list of pointers in the output buffer memory if the packet size indicates the packet is long; and
an egress queue to buffer the contiguous data block transferred from the output buffer memory.

46. The system of claim 45 wherein the input buffer memory and the output buffer memory have same sizes.

47. The system of claim 45 wherein the input buffer memory and the output buffer memory have different sizes.

48. The system of claim 45 wherein the first type is a static random access memory and the second type is a synchronous dynamic random access memory.

* * * * *

UNITED STATES PATENT AND TRADEMARK OFFICE
CERTIFICATE OF CORRECTION

PATENT NO. : 7,301,954 B1 Page 1 of 1
APPLICATION NO. : 09/668407
DATED : November 27, 2007
INVENTOR(S) : Tam-Anh Chu It is certified that error appears in the above-identified patent and that said Letters Patent is hereby corrected as shown below:

In the Claims, Column 11, Line 8, the following error is noted: "...chunk comprising at least one chunk data block (comma missing) the connection..." It should be corrected to read as follows: --...chunk comprising at least one chunk data block, the connection..."--.

Signed and Sealed this

Third Day of February, 2009

JOHN DOLL
*Acting Director of the United States Patent and Trademark Office*